US012228005B2

(12) United States Patent
Rakhunde et al.

(10) Patent No.: US 12,228,005 B2
(45) Date of Patent: Feb. 18, 2025

(54) ELECTRICAL ACCUMULATOR SYSTEM WITH INTERNAL TRANSFER BARRIER

(71) Applicant: Schlumberger Technology Corporation, Sugar Land, TX (US)

(72) Inventors: Vikas Rakhunde, Cypress, TX (US); Sean Clarke, Katy, TX (US); Gerrit Kroesen, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/715,805

(22) PCT Filed: Mar. 9, 2023

(86) PCT No.: PCT/US2023/064056
§ 371 (c)(1),
(2) Date: Jun. 3, 2024

(87) PCT Pub. No.: WO2023/178014
PCT Pub. Date: Sep. 21, 2023

(65) Prior Publication Data

US 2024/0418051 A1 Dec. 19, 2024

Related U.S. Application Data

(60) Provisional application No. 63/269,290, filed on Mar. 14, 2022.

(51) Int. Cl.
*E21B 33/064* (2006.01)
*E21B 33/035* (2006.01)
*F15B 1/04* (2006.01)

(52) U.S. Cl.
CPC ........ *E21B 33/0355* (2013.01); *E21B 33/064* (2013.01); *F15B 1/04* (2013.01); *F15B 2211/625* (2013.01)

(58) Field of Classification Search
CPC ...... E21B 33/0355; E21B 33/064; F15B 1/04; F15B 2211/625
See application file for complete search history.

(56) References Cited

U.S. PATENT DOCUMENTS

| | | | |
|---|---|---|---|
| 5,505,426 | A | 4/1996 | Whitby |
| 6,202,753 | B1 | 3/2001 | Baugh |

(Continued)

FOREIGN PATENT DOCUMENTS

| | | | | | |
|---|---|---|---|---|---|
| CN | 110030213 | A * | 7/2019 | ................ | F03C 1/26 |
| EP | 2917461 | A1 | 9/2015 | | |

(Continued)

OTHER PUBLICATIONS

Quantum Leap Technologies, Integrated Power Solutions, https://www.qltech.net/, Westhill, UK, 2019.

(Continued)

*Primary Examiner* — Matthew R Buck
(74) *Attorney, Agent, or Firm* — Jeffrey D. Frantz

(57) ABSTRACT

An accumulator system includes a housing, including a motor housing including an electric motor, a function chamber and an anti-rotating chamber each coupled to the motor housing, a balance chamber, a transfer chamber disposed between the anti-rotating chamber and the balance chamber, a shaft configured to move axially within the function chamber, the anti-rotating chamber, and the transfer chamber, a first piston coupled to a first end of the shaft, a second piston coupled to a second end of the shaft, and third piston configured to separate the transfer chamber from the balance chamber. The electric motor is coupled to and drives the shaft to alternatingly compress working fluid with the first piston in the function chamber to drive the working fluid out of the function chamber, and compress transfer fluid with the (Continued)

second piston in the transfer chamber to drive the transfer fluid out of the transfer chamber.

20 Claims, 6 Drawing Sheets

(56) References Cited

U.S. PATENT DOCUMENTS

| | | | | |
|---|---|---|---|---|
| 6,234,771 | B1 | 5/2001 | Carey | |
| 6,998,724 | B2 | 2/2006 | Johansen | |
| 7,137,450 | B2 | 11/2006 | Johansen | |
| 7,156,183 | B2 | 1/2007 | Williams | |
| 7,159,662 | B2 | 1/2007 | Johansen | |
| 7,520,129 | B2 | 4/2009 | Springett | |
| 7,878,244 | B2 | 2/2011 | Nold, III | |
| 8,651,190 | B2 | 2/2014 | Dietz | |
| 8,657,011 | B2 | 2/2014 | Vyas | |
| 8,784,074 | B2 | 7/2014 | Davey | |
| 9,140,090 | B2 | 9/2015 | Van Wijk | |
| 9,222,326 | B2 | 12/2015 | Whitby | |
| 9,388,888 | B2 | 7/2016 | Eriksen | |
| 9,494,007 | B2 | 11/2016 | Bourgeau | |
| 9,587,455 | B2 | 3/2017 | Frey | |
| 9,627,940 | B2 | 4/2017 | Eriksen | |
| 9,822,600 | B2 | 11/2017 | Bourgeau | |
| 9,885,221 | B2 | 2/2018 | Baugh | |
| 9,957,768 | B2 | 5/2018 | Van Wijk | |
| 10,132,135 | B2 | 11/2018 | Gaude | |
| 10,316,605 | B2 | 6/2019 | Bourgeau | |
| 10,365,669 | B2 | 7/2019 | Groves | |
| 10,801,292 | B2 | 10/2020 | Biester | |
| 10,851,805 | B2 | 12/2020 | Thomson | |
| 10,975,891 | B2 | 4/2021 | Afshari | |
| 11,060,372 | B2 | 7/2021 | Bourgeau | |
| 11,441,479 | B2 | 9/2022 | Richards | |
| 11,441,579 | B2 | 9/2022 | Nault | |
| 2011/0147002 | A1 | 6/2011 | Kotrla | |
| 2013/0019980 | A1 | 1/2013 | Baugh | |
| 2013/0283919 | A1 | 10/2013 | Coonrod | |
| 2014/0027105 | A1 | 1/2014 | Irani | |
| 2014/0166264 | A1 | 6/2014 | Judge | |
| 2014/0219848 | A1 | 8/2014 | Rabhi | |
| 2014/0325974 | A1 | 11/2014 | Schulz | |
| 2015/0104328 | A1 | 4/2015 | Babbitt | |
| 2015/0211504 | A1 | 7/2015 | Dieringer | |
| 2017/0145773 | A1 | 5/2017 | Van Wijk | |
| 2018/0347304 | A1 | 12/2018 | Alalasundaram | |
| 2019/0003275 | A1 | 1/2019 | Deul | |
| 2019/0203739 | A1 | 7/2019 | Afshari | |
| 2019/0218879 | A1 | 7/2019 | Biester | |
| 2020/0056630 | A1 | 2/2020 | Nault | |
| 2020/0072012 | A1 | 3/2020 | Angstmann | |
| 2020/0173465 | A1 * | 6/2020 | Nault | F15B 21/006 |
| 2020/0284274 | A1 | 9/2020 | van Kuilenburg | |
| 2020/0408058 | A1 | 12/2020 | Pedersen | |
| 2022/0389941 | A1 | 12/2022 | Nault | |

FOREIGN PATENT DOCUMENTS

| | | | |
|---|---|---|---|
| EP | 3502410 | A1 | 6/2019 |
| WO | 2012140178 | A1 | 10/2012 |
| WO | 2017042152 | A1 | 3/2017 |
| WO | 2017062040 | A1 | 4/2017 |

OTHER PUBLICATIONS

Quam SC-SSV control line blow out preventer product sheet, QUAM, accessed via https://www.iamquam.it/Control-Line-Blowout-Preventer.php on Feb. 25, 2022, 2 pages.

* cited by examiner

ELECTRICAL ACCUMULATOR SYSTEM WITH INTERNAL TRANSFER BARRIER

CROSS-REFERENCE TO RELATED APPLICATION

The present document is the National Stage Entry of International Application No. PCT/US2023/064056, filed Mar. 9, 2023, which is based on and claims priority to U.S. Provisional Patent Application No. 63/269,290, filed Mar. 14, 2022, which is incorporated herein by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Once a desired subterranean resource is discovered, drilling and production systems are employed to access and extract the resource. These systems may be located onshore or offshore depending on the location of the desired resource. Such systems generally include a wellhead assembly through which the resource is extracted. These wellhead assemblies may include a wide variety of components, such as various casings, valves, fluid conduits, that control drilling or extraction operations.

Deepwater accumulators provide a supply of pressurized working fluid for the control and operation of subsea equipment, such as through hydraulic actuators and motors. Typical subsea equipment may include, but is not limited to, blowout preventers (BOPs) that shut off the well bore, gate valves for flow control of oil or gas, electro-hydraulic control pods, or hydraulically-actuated connectors and similar devices. There is a need to replace traditional accumulators with a battery driven actuated piston to provide increased useable volume for emergency operations.

SUMMARY

A system according to one or more embodiments of the present disclosure includes an accumulator system including: a housing, the housing including: a motor housing comprising an electric motor, a function chamber coupled to the motor housing, a balance chamber, a transfer chamber disposed between the anti-rotating chamber and the balance chamber, a shaft configured to move axially within the function chamber, the anti-rotating chamber, and the transfer chamber, a first piston coupled to a first end of the shaft, a second piston coupled to a second end of the shaft, wherein the electric motor is coupled to and drives the shaft to alternatingly compress working fluid with the first piston in the function chamber to drive the working fluid out of the function chamber, and compress transfer fluid with the second piston in the transfer chamber to drive the transfer fluid out of the transfer chamber, and a third piston configured to separate the transfer chamber from the balance chamber.

A system according to one or more embodiments of the present disclosure includes a first accumulator system, a second accumulator system, an electric module including a battery system, the electric module being electrically coupled to the first and second accumulator systems, and a drilling component hydraulically coupled to the first and second accumulator systems.

A method according to one or more embodiments of the present disclosure includes obtaining a blowout preventer stack assembly including: obtaining a blowout preventer stack assembly including: a lower marine riser package connected to a blowout preventer package, the blowout preventer stack assembly connected in line between a wellhead assembly and floating rig through a riser, detecting an emergency event, in response to the emergency event, sending a command to an electronic module including a battery system, the electronic module being electrically coupled to at least one accumulator system on the blowout preventer package, activating a sequence to drive the at least one accumulator system, using the at least one accumulator system to hydraulically actuate a component of the blowout preventer package to a closed position, and pressurizing a transfer fluid to actuate the component of the blowout preventer package to an open position, wherein the at least one accumulator system and the component of the blowout preventer package create a closed loop.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein. The figures are not necessarily to scale and certain features and certain views of the figures may be shown exaggerated in scale for purposes of clarification.

DETAILED DESCRIPTION

Figure 1:
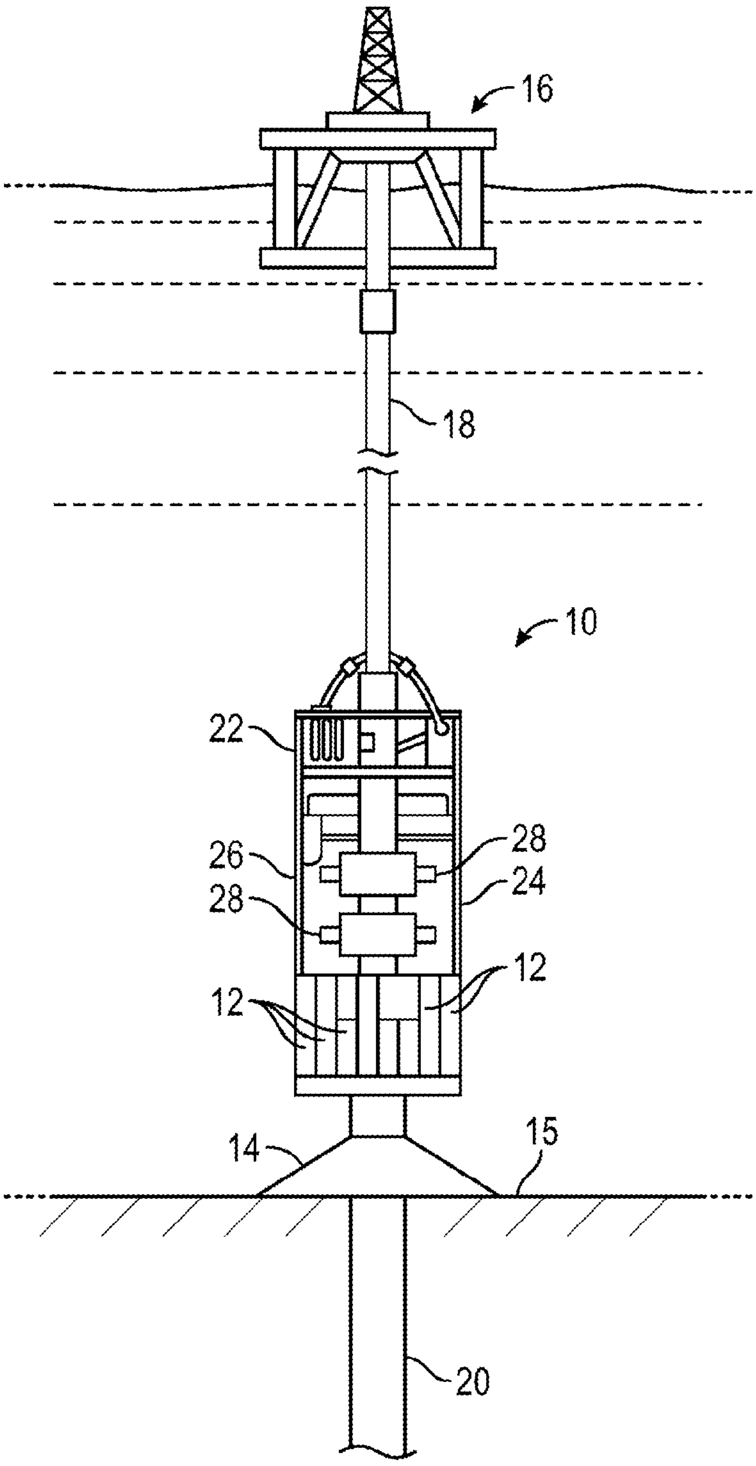
FIG. 1 is a schematic of a subsea BOP stack assembly having one or more accumulator systems, according to one or more embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Typical accumulators may be divided into a gas section and a hydraulic fluid section that operate on a common principle. The general principle is to pre-charge the gas section with pressurized gas to a pressure at or slightly below the anticipated minimum pressure to operate the subsea equipment. Fluid can be added to the accumulator in the separate hydraulic fluid section, compressing the gas section, thus increasing the pressure of the pressurized gas and the hydraulic fluid together. The hydraulic fluid introduced into the accumulator is therefore stored at a pressure equivalent to the pre-charge pressure and is available for doing hydraulic work. However, gas-charged accumulators used in subsea environments may undergo a decrease in efficiency as water depth increases. This loss of efficiency is due, at least in part, to an increase of hydrostatic stress acting on the pre-charged gas section, which provides the power to the accumulators through the compressibility of the gas.

The pre-charge gas can be said to act as a spring that is compressed when the gas section is at its lowest volume and greatest pressure, and released when the gas section is at its greatest volume and lowest pressure. Accumulators may be pre-charged in the absence of hydrostatic pressure and the pre-charge pressure may be limited by the pressure containment and structural design limits of the accumulator vessel under surface ambient conditions. Yet, as described above, as accumulators are used in deeper water, their efficiency decreases as application of hydrostatic pressure causes the gas to compress, leaving a progressively smaller volume of gas to charge the hydraulic fluid. The gas section must consequently be designed such that the gas still provides enough power to operate the subsea equipment under hydrostatic pressure even as the hydraulic fluid approaches discharge and the gas section is at its greatest volume and lowest pressure.

For example, accumulators at the surface may provide 3,000 psi (pounds per square inch) maximum working fluid pressure. In 1,000 feet of seawater, the ambient pressure is approximately 465 psi. Therefore, for an accumulator to provide a 3,000 psi differential at the 1,000 foot depth, it must actually be pre-charged to 3,000 psi plus 465 psi, or 3,465 psi. At slightly over 4,000 feet water depth, the ambient pressure is almost 2,000 psi. Therefore, the pre-charge would be required to be 3,000 psi plus 2,000 psi, or 5,000 psi. In other words, the pre-charge would be almost double the working pressure of the accumulator. Thus, at progressively greater hydrostatic operating pressures, the accumulator has greater pressure containment requirements at non-operational (e.g., no ambient hydrostatic pressure) conditions.

Given the limited structural capacity of the accumulator to contain the gas pre-charge, operators of this type of equipment may be forced to work within efficiency limits of the systems. For example, when deep water systems are required to utilize hydraulic accumulators, operators will often add additional accumulators to the system. Some accumulators may be charged to 500 psi, 2,000 psi, 5,000 psi, or higher, based on system requirements. As the equipment is initially deployed in the water, all accumulators may operate normally. However, as the equipment is deployed in deeper water (e.g., past 1,000 feet), the accumulators with the 500 psi pre-charge may become inefficient due to the hydrostatic compression of the gas charge. Additionally, the hydrostatic pressure may act on all the other accumulators, decreasing their efficiency. The decrease in efficiency of the subsea gas charged accumulators decreases the amount and rate of work which may be performed at deeper water depths. As such, for subsea equipment designed to work beyond 5,000 foot water depth, the amount of gas charged accumulators may be increased by 5 to 10 times. The addition of these accumulators increases the size, weight, and complexity of the subsea equipment.

Conversely, the disclosed embodiments do not rely on gas to provide power to a working fluid. Rather, the accumulator systems include an electric actuator that drives a piston to pressurize a working fluid that then actuates one or more drilling system components (e.g., blowout preventer). This means that the accumulator systems discussed below may not experience a loss in efficiency due to water depth. Additionally, the accumulator systems discussed below vary pressure output since the electric actuator may be controlled in response to pressure demands of the drilling system or component. In addition to the accumulator systems discussed below, suitable accumulator systems that do not rely on gas to provide power to a working fluid are disclosed in U.S. Patent Application Publication No. 2020/0173465 and U.S. Patent Application Publication No. 2020/0056630, which are incorporated by reference herein in their entirety.

FIG. 1 depicts a subsea BOP stack assembly 10, which may include one or more accumulator systems 12 that power one or more components on the subsea BOP stack assembly 10. According to one or more embodiments of the present disclosure, the subsea BOP stack assembly 10 may be employed in either deepwater or shallow water environments without departing from the scope of the present disclosure. As illustrated, the BOP stack assembly 10 may be assembled onto a wellhead assembly 14 on the sea floor 15. The BOP stack assembly 10 may be connected in line between the wellhead assembly 14 and a floating rig 16 through a subsea riser 18. The BOP stack assembly 10 may provide emergency fluid pressure containment in the event that a sudden pressure surge escapes the wellbore 20. Therefore, the BOP stack assembly 10 may be configured to prevent damage to the floating rig 16 and the subsea riser 18 from fluid pressure exceeding design capacities. The BOP stack assembly 10 may also include a BOP lower marine riser package 22, which may connect the subsea riser 18 to a BOP package 24.

In certain embodiments, the BOP package 24 may include a frame 26, BOPs 28, and accumulator systems 12, which may be used to provide hydraulic fluid pressure for actuating the BOPs 28. The accumulator systems 12 may be incorporated into the BOP package 24 to maximize the available space and leave maintenance routes clear for working on components of the subsea BOP package 24. The accumulator systems 12 may be installed in parallel where the failure of any single accumulator system 12 may prevent the additional accumulator systems 12 from functioning.

Figure 2:
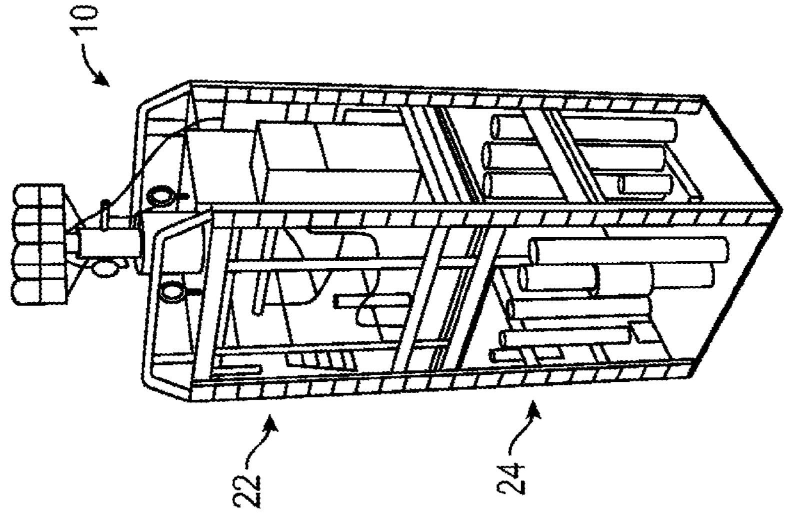
FIG. 2 is a detailed perspective view of a subsea BOP stack assembly, according to one or more embodiments of the present disclosure.

Referring now to FIG. 2, a detailed perspective view of a subsea BOP stack assembly 10 is shown, according to one or more embodiments of the present disclosure. As shown, the subsea BOP stack assembly 10 includes a lower marine riser package 22 connected to a BOP package 24, as previously described with respect to FIG. 1. Further, the BOP package 24 shown in FIG. 2 may include at least one accumulator system 12*a*, 12*b* and at least one BOP component 28, as previously described with respect to FIG. 1, and as further described below.

Figure 3:
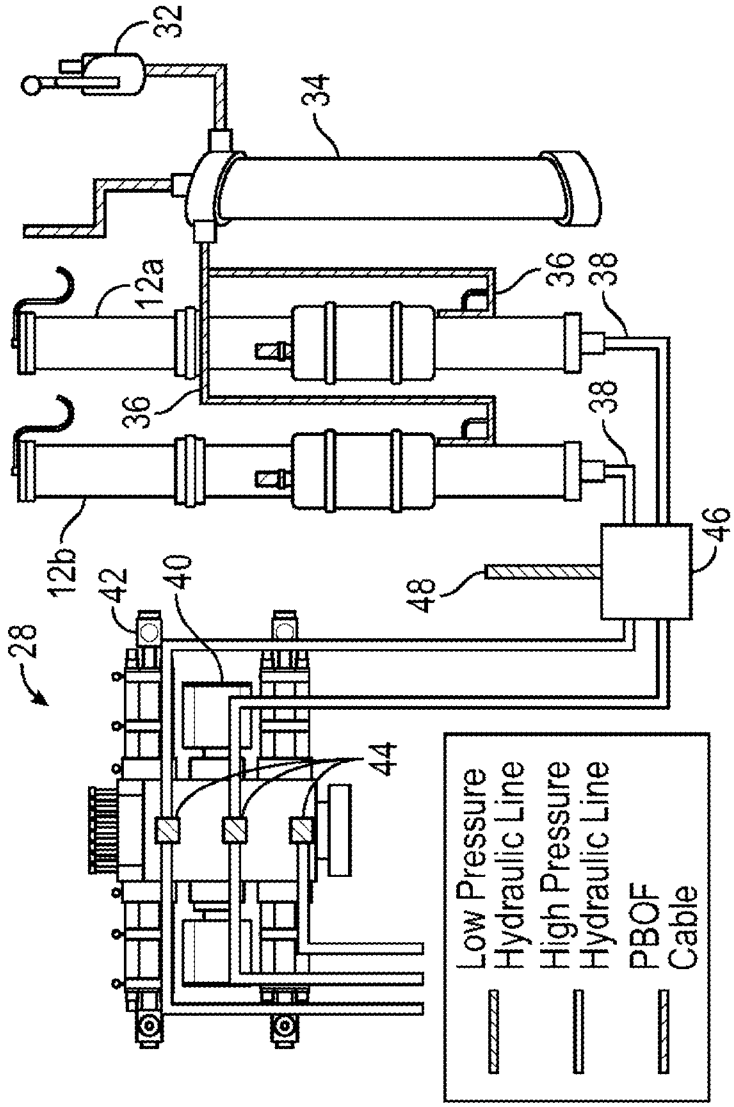
FIG. 3 shows a system level arrangement for electrical accumulator systems used in a BOP control system, according to one or more embodiments of the present disclosure.

Referring now to FIG. 3, a system level arrangement for electrical accumulator systems 12*a*, 12*b* used in a BOP control system 30 is shown, according to one or more embodiments of the present disclosure. Specifically, the electrical accumulator systems 12*a*, 12*b* used in the BOP control system 30 facilitate emergency control system requirements including deadman and autoshear functionalities, according to one or more embodiments of the present disclosure. The BOP control system 30 according to one or more embodiments of the present disclosure also covers requirements for secondary or contingency control systems such as an acoustic control system and a remotely operated vehicle ("ROV") intervention system, for example. The BOP control system 30 according to one or more embodiments of the present disclosure may also support the execution of an Emergency Disconnect Sequence ("EDS"), for example. As shown in FIG. 3, the BOP control system 30 may include a trigger valve 32. According to one or more embodiments of the present disclosure, the trigger valve 32 may be connected between the lower marine riser package 22 and the BOP package 24, for example. After an emergency event is detected, the trigger valve 32 may send a command to an electronic module 34 to activate a sequence to drive at least one accumulator system 12*a*, 12*b*, as shown in FIG. 3, for example. According to one or more embodiments of the present disclosure, the sequence to drive the at least one accumulator system 12*a*, 12*b* may be based on a predefined time and pressure curve, such as an idealized shear pressure versus time profile, for example. According to one or more embodiments of the present disclosure, examples of such an emergency event include disconnection of the lower marine riser package 22 from the BOP package 24, and/or loss of at least one of power, communications, or hydraulic connection between the BOP stack assembly 10 and the floating rig 16. In this way, the BOP control system 30 according to one or more embodiments of the present disclosure provides autoshear and deadman functionalities. According to one or more embodiments of the present disclosure, the electronic module 34 may include a battery system, a variable frequency drive for driving associated electronic accumulator systems 12*a*, 12*b*, and a charging system for providing a trickle charge to charge one or more batteries of the battery system, for example. According to one or more embodiments of the present disclosure, the electronic module 34 may also include a detector for detecting an emergency signal from the trigger valve 32. According to one or more embodiments of the present disclosure, the electronic module 34 may be electrically coupled to at least one accumulator system 12 on the BOP package 24, as shown in FIG. 3, for example. According to one or more embodiments of the present disclosure, the electronic module 34 may be electrically coupled to at least one accumulator system 12*a*, 12*b* via an electric cable 36 such as a pressure balanced oil filled ("PBOF") cable, for example. While FIG. 3 shows that the BOP control system 30 includes two electronic accumulator systems 12*a*, 12*b*, the BOP control system 30 may have one electronic accumulator system or more than two electronic accumulator systems without departing from the scope of the present disclosure.

Still referring to FIG. 3, the BOP control system 30 according to one or more embodiments of the present disclosure may include a drilling component hydraulically coupled to the electronic accumulator systems 12*a*, 12*b*. According to one or more embodiments of the present disclosure, the drilling component may be hydraulically coupled to the electronic accumulator systems 12*a*, 12*b* via hydraulic line 38, which is rated for high pressure as understood by one having ordinary skill in the art, for example. According to one or more embodiments of the present disclosure, the drilling component may be a BOP 28, or another hydraulically actuated drilling component, for example. According to one or more embodiments of the present disclosure, and as further described below, a working fluid may be expelled from at least one of the electronic accumulator systems 12*a*, 12*b* and into the high pressure hydraulic line 38 to actuate the BOP 28 from an open position to a closed position during an emergency disconnect sequence, deadman operation, or autoshear operation, for example. According to one or more embodiments of the present disclosure, each electronic accumulator system 12*a*, 12*b* of the BOP control system 30 may correspond to a dedicated shear ram of the BOP 28. As shown in FIG. 3, for example, the electronic accumulator system 12*a* is hydraulically coupled to a casing shear ram 40 of the BOP 28, and the electronic accumulator system 12*b* is hydraulically coupled to a blind shear ram 42 of the BOP 28, according to one or more embodiments of the present disclosure. As further shown in FIG. 3, the BOP 28 may include a shuttle valve 44 to facilitate application of hydraulic fluid to individual components of the BOP 28, as understood by those having ordinary skill in the art, according to one or more embodiments of the present disclosure.

Still referring to FIG. 3, the BOP control system 30 may also include a low pressure charge module 46 connected to a low pressure hydraulic line 48, according to one or more embodiments of the present disclosure. In one or more embodiments of the present disclosure, hydraulic fluid within the low pressure hydraulic line 48 may enter the low pressure charge module 46 to refill one or both of the electronic accumulator systems 12*a*, 12*b* after expulsion of the working fluid from one or both of the electronic accumulator systems 12*a*, 12*b* to actuate the BOP 28 from an open position to a closed position during an emergency disconnect sequence, as previously described. After the electronic accumulator systems 12*a*, 12*b* are refilled, the electronic accumulator systems 12*a*, 12*b* of the BOP control system 30 will be primed for handling a subsequent emergency event.

Figure 4:
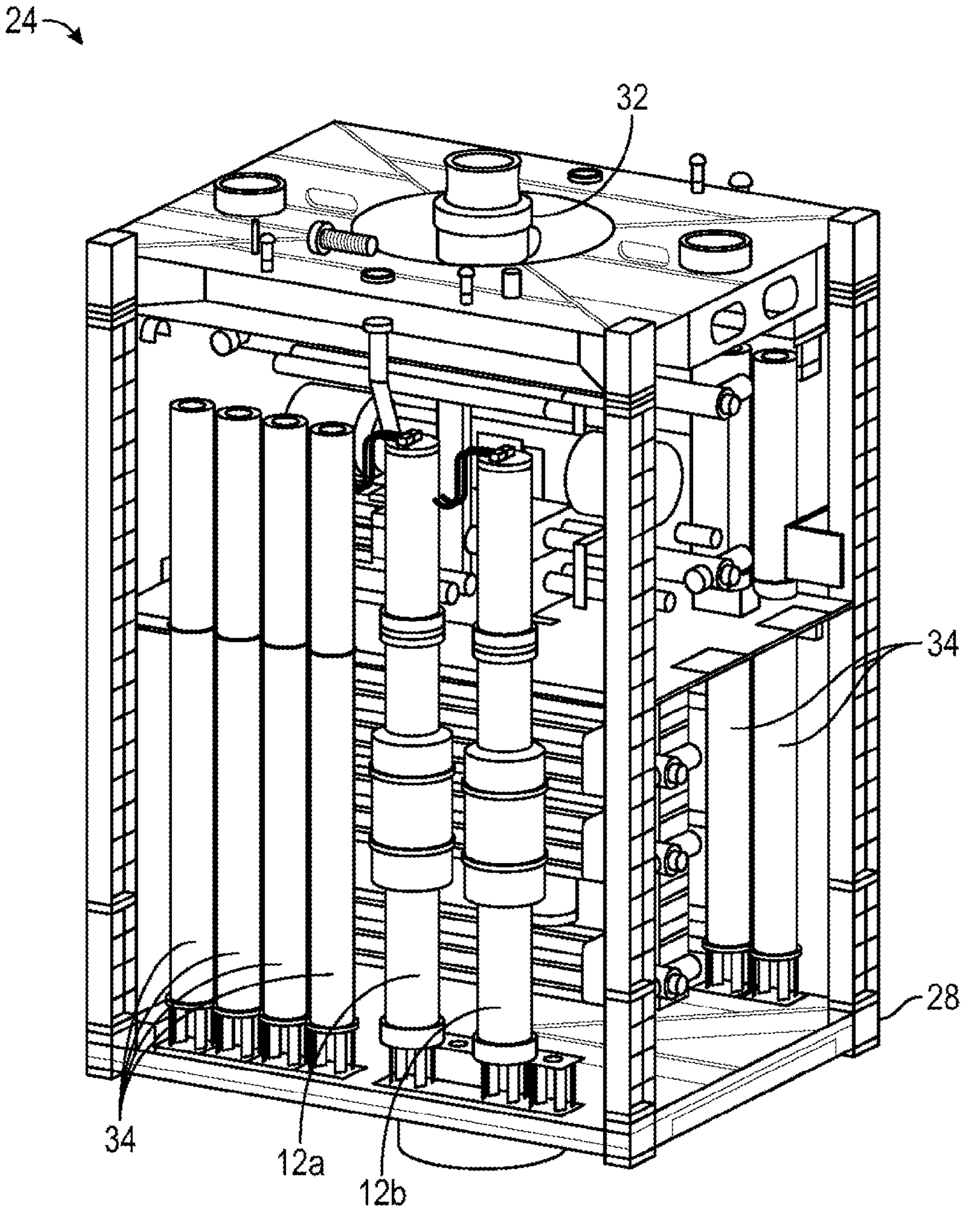
FIG. 4 shows a blowout preventer package of a subsea BOP stack assembly, according to one or more embodiments of the present disclosure.

Referring now to FIG. 4, a BOP package 24 of a subsea BOP stack assembly 10, according to one or more embodiments of the present disclosure is shown. Specifically, FIG. 4 shows how the electronic module(s) 34, the electronic accumulator systems 12*a*, 12*b*, and the BOP 28 may be packaged together in the BOP package 24, according to one or more embodiments of the present disclosure. As shown in FIG. 4, the BOP package 24 may include a plurality of electronic modules 34 on board to provide additional power to electronic accumulator systems 12*a*, 12*b* and other components of the BOP package 24, according to one or more embodiments of the present disclosure.

Figure 5:
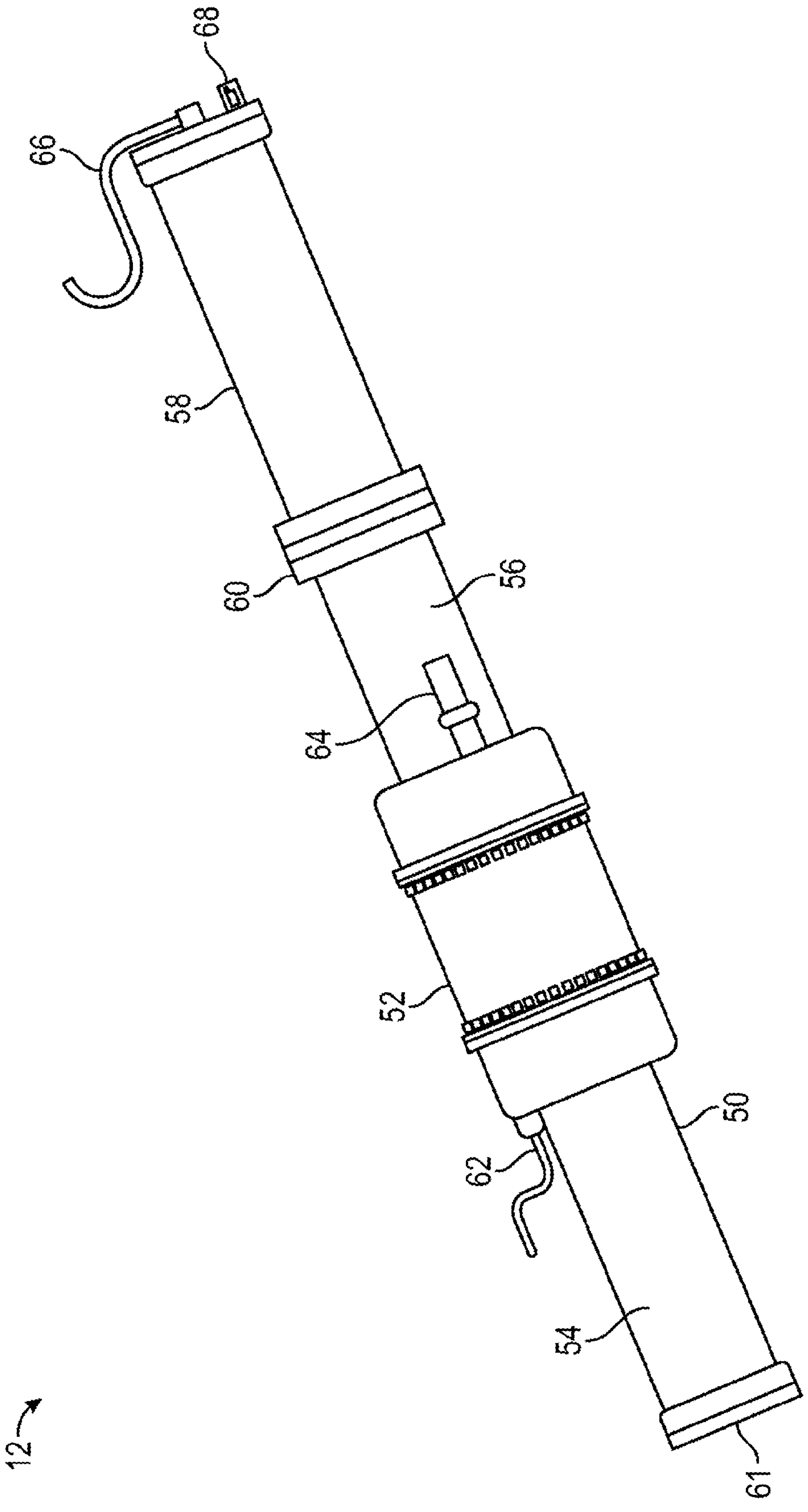
FIG. 5 shows an electronic accumulator system, according to one or more embodiments of the present disclosure.

Referring now to FIG. 5, an electronic accumulator system 12 according to one or more embodiments of the present disclosure is shown. As shown in FIG. 5, the electronic accumulator system 12 according to one or more embodiments of the present disclosure includes a housing 50, which includes a motor housing 52, a function chamber 54 coupled to the motor housing 52, an anti-rotating chamber 56 coupled to the motor housing 52, and a balance chamber 58, for example. As further described below in view of FIGS. 6A and 6B, the electronic accumulator system 12 according to one or more embodiments of the present disclosure may also include a shaft 59 that is configured to move axially within the function chamber 54 and the anti-rotating chamber 56. The electronic accumulator system 12 according to one or more embodiments of the present disclosure may also include an anti-rotating flange 60 that defines the anti-rotating chamber 56. According to one or more embodiments of the present disclosure, the anti-rotating flange 60 is configured to block rotation of the shaft 59 as the shaft 59 moves axially within the function chamber 54 and the anti-rotating chamber 56. The electronic accumulator system 12 may also include embodiments that include a transfer chamber 57 disposed between the anti-rotating chamber 56 and the balance chamber 58, as further described below in view of FIGS. 6A and 6B, for example.

Still referring to FIG. 5, the electronic accumulator system 12 according to one or more embodiments of the present disclosure may include a pressure port 61, which provides the outlet for the working fluid within the function chamber 54 to be expelled to actuate the hydraulically connected drilling component (e.g., a BOP 28), and the inlet for low pressure hydraulic fluid to refill the function chamber 54 after expulsion of the working fluid, as previously described. The electronic accumulator system 12 according to one or more embodiments of the present disclosure may also include a cable connector 62 for connecting an electric cable 36, such as that previously described in view of FIG. 3, for example. Further, the electronic accumulator system 12 may include a compensator 64 for dielectric fluid disposed in the motor housing 52, which compensates for volume changes due to temperature, turbulence, or fluid loss, according to one or more embodiments of the present disclosure. As also shown in FIG. 5, the electronic accumulator system 12 may include one or more U tubes 66 to maintain a barrier between balance fluid within the balance chamber 58 and hydraulic fluid, as further described below in view of FIGS. 6A and 6B, for example. According to one or more embodiments of the present disclosure, the balance fluid within the balance chamber 58 may be seawater, for example. According to one or more embodiments of the present disclosure, the balance fluid within the balance chamber 58 balances hydrostatic pressure exerted on the electronic accumulator system 12 by seawater at depth in subsea environments. According to one or more embodiments of the present disclosure, the electronic accumulator system 12 may also include a flushing port 68 for flushing out excess seawater from the balance chamber 58.

Figure 6A:
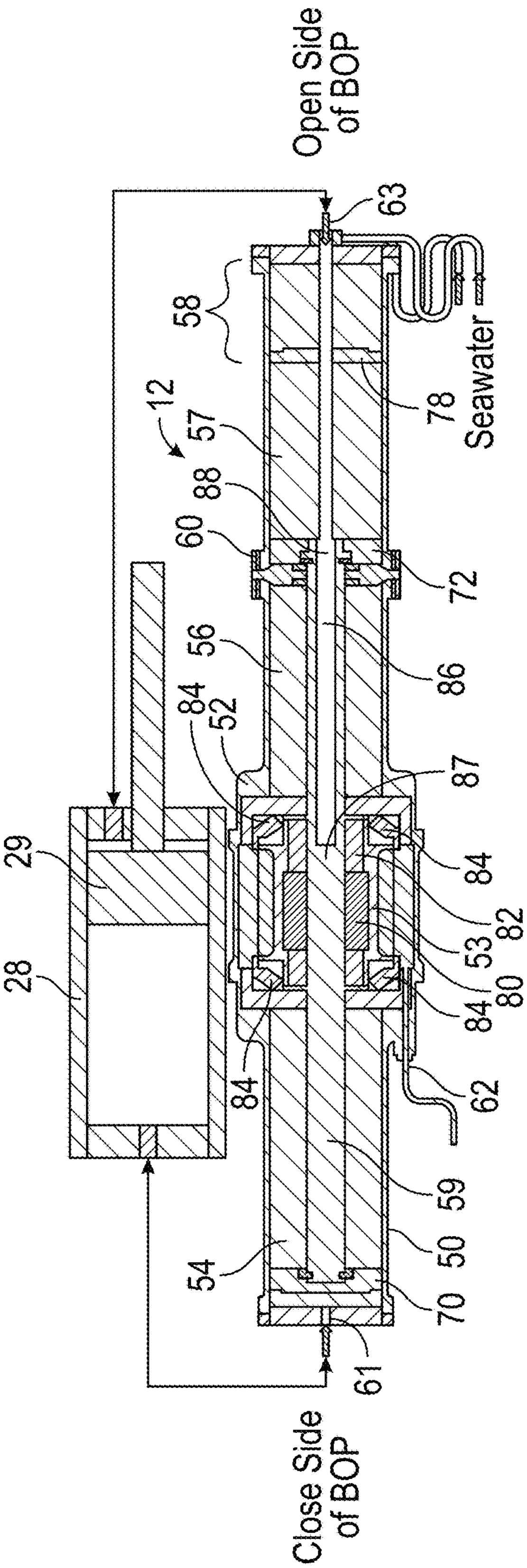
FIGS. 6A-6B show different configurations of an electronic accumulator system having a transfer chamber, according to one or more embodiments of the present disclosure.
Figure 6B:
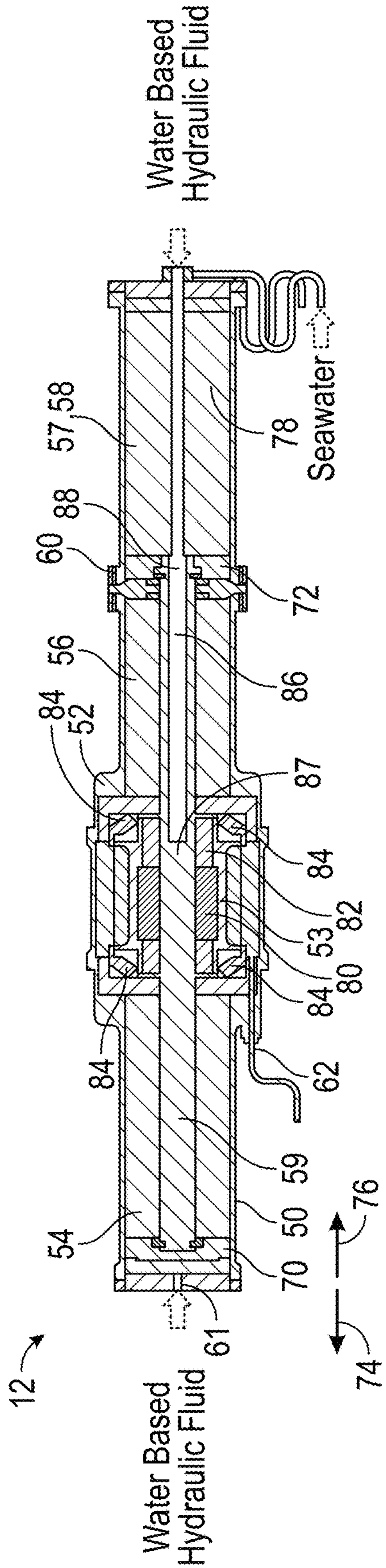

Referring now to FIGS. 6A-6B, different configurations of an electronic accumulator system 12 having a transfer chamber 57, according to one or more embodiments of the present disclosure, are shown. Specifically, FIG. 6A shows the electronic accumulator system 12 as a component of a larger system that includes a drilling component, such as a BOP 28, hydraulically coupled to the electronic accumulator system 12. As previously described with respect to FIG. 3, for example, the larger system may include more than one electronic accumulator system 12 electrically connected to an electronic module 34, and hydraulically connected to dedicated shear rams of the BOP 28, according to one or more embodiments of the present disclosure. FIG. 6A simplifies the BOP 28 by showing that the BOP 28 may include a BOP piston 29, which actuates to open and close the BOP 28. FIG. 6A shows the BOP 28 in a closed configuration. As previously described with respect to FIG. 5, the electronic accumulator system 12 shown in FIGS. 6A and 6B includes a housing 50, which includes a motor housing 52, a function chamber 54 coupled to the motor housing 52, an anti-rotating chamber 56 coupled to the motor housing 52, and a balance chamber 58, for example. Notably, the electronic accumulator system 12 shown in FIGS. 6A and 6B is different from the electronic accumulator system 12 shown in FIG. 5, as previously described, at least because the electronic accumulator system 12 shown in FIGS. 6A and 6B includes a transfer chamber 57 disposed between the anti-rotating chamber 56 and the balance chamber 58, according to one or more embodiments of the present disclosure.

Still referring to FIGS. 6A and 6B, the electronic accumulator system 12 according to one or more embodiments of the present disclosure also includes a shaft 59 that is configured to move axially within the function chamber 54, the anti-rotating chamber 56, and the transfer chamber 57. Also similar to FIG. 5, the electronic accumulator system 12 shown in FIGS. 6A and 6B may include an anti-rotating flange 60 that defines the anti-rotating chamber 56, according to one or more embodiments of the present disclosure. The anti-rotating chamber 56 is configured to block rotation of the shaft 59 as the shaft 59 moves axially within the function chamber 54, the anti-rotating chamber 56, and the transfer chamber 57, according to one or more embodiments of the present disclosure. As further shown in FIGS. 6A and 6B, the shaft 59 may include a first piston 70 coupled to a first end of the shaft 59, and a second piston 72 coupled to a second end of the shaft 59, according to one or more embodiments of the present disclosure.

Also similar to FIG. 5, the electronic accumulator system 12 shown in FIGS. 6A and 6B may include a pressure port 61, which provides the outlet for the working fluid within the function chamber 54 to be expelled to actuate the hydraulically connected drilling component (e.g., a BOP 28), and the inlet for low pressure hydraulic fluid to refill the function chamber 54 after expulsion of the working fluid, as previously described. Also similar to FIG. 5, the electronic accumulator system 12 shown in FIGS. 6A and 6B may also include a cable connector 62 for connecting an electric cable 36, such as that previously described in view of FIG. 3, for example. Also similar to FIG. 5, the balance fluid within the balance chamber 58 of the electronic accumulator system 12 shown in FIGS. 6A and 6B may be seawater, for example, according to one or more embodiments of the present disclosure. The balance fluid within the balance chamber 58 balances hydrostatic pressure exerted on the electronic accumulator system 12 by seawater at depth in subsea environments. In addition to balancing hydrostatic pressure, the balance fluid within the balance chamber 58 also balances the electronic accumulator system 12 as transfer fluid fills and exits the transfer chamber 57, according to one or more embodiments of the present disclosure. Although not specifically shown in FIGS. 6A and 6B, one or more embodiments of the electronic accumulator system 12 having a transfer chamber 57 may also include a flushing port 68 that flushes out excess balance fluid or seawater from the balance chamber 58, as previously described with respect to FIG. 5, for example. As shown in FIGS. 6A and 6B, one or more embodiments of the electronic accumulator system 12 having a transfer chamber 57 may also include one or more U tubes 66, which in cooperation with the third piston 78, maintain a barrier between balance fluid within the balance chamber 58 and hydraulic fluid or transfer fluid within the transfer chamber 57, according to one or more embodiments of the present disclosure. The barrier between these fluids is further maintained by flushing the flushing port 68 with hydraulic fluid, according to one or more embodiments of the present disclosure. In this way, the U tubes 66 of the electronic accumulator system 12 facilitate corrosion protection of the third piston 78 and the balance chamber 58 when the electronic accumulator system 12 is fully filled and ready to operate. In normal conditions, the balance chamber 58 may be empty of balance fluid. Indeed, the electronic accumulator system 12 according to one or more embodiments of the present disclosure may allow balance fluid or seawater into the balance chamber 58 only in case of activation of the electric motor 53. Upon activation of the electric motor 53, balance fluid or seawater fills the balance chamber 58, and after conditions return to safety, the BOP piston 29 returns to the normal open position, but some balance fluid or seawater may remain in the balance chamber 58. In such cases, the flushing port 68 and U tubes 66 are provided to remove the balance fluid or seawater from the balance chamber 58 of the electronic accumulator system 12.

Still referring to FIGS. 6A and 6B, the motor housing 52 of the electronic accumulator system 12 may include an electric motor 53, as previously described, according to one or more embodiments of the present disclosure. The electric motor 53 of the electronic accumulator system 12 may be powered by the electric cable 36, as previously described with respect to FIG. 3, for example. According to one or more embodiments of the present disclosure, the electric motor 53 may include a stator and a rotor that includes magnets (e.g., electromagnets, permanent magnets, combinations of electromagnets and permanent magnets). In operation, the rotor rotates in response to electrical power supplied to the magnets of the stator and/or the rotor. As the rotor rotates, the rotor rotates a screw adapter 82. As shown in FIGS. 6A and 6B, the screw adapter 82 defines an aperture that enables the shaft 59 to extend through the screw adapter 82. According to one or more embodiments of the present disclosure, the screw adapter 82 receives a nut assembly 80 (e.g., a planetary roller screw) in the aperture of the screw adapter 82. As shown in FIGS. 6A and 6B, the nut assembly 80 may be coupled to the shaft 59 and to the electric motor 53, according to one or more embodiments of the present disclosure. The nut assembly 80 includes a plurality of roller screws that engage the shaft 59, according to one or more embodiments of the present disclosure. As the screw adapter 82 rotates, the plurality of roller screws engage an exterior threaded surface of the shaft 59. That is, rotation of the screw adapter 82 is configured to rotate the nut assembly 80, according to one or more embodiments of the present disclosure. As the roller screws of the nut assembly 80 rotate, the roller screws drive the shaft 59 axially in directions 74 and 76. According to one or more embodiments of the present disclosure, the electronic accumulator system 12 may also include a plurality of bearings 84 that enable rotation of the screw adapter 82, as shown in FIGS. 6A and 6B, for example. According to one or more embodiments of the present disclosure, the plurality of bearings 84 may bear the resulting thrust load and keep the rotating portion of the electric motor 53, which contains the magnets, centered in the electric motor 53. According to one or more embodiments of the present disclosure, the motor housing 52 may be filled with a relatively low viscosity dielectric or non-conducting/conducting fluid and/or lubricant, for example. As such, when the first piston 70 and the second piston 72 stroke, the dielectric fluid will travel through the electric motor 53, nut assembly 80, screw adapter 82, and bearings 84, thereby cooling the channels and components of the electric motor 53. In addition, the dielectric fluid provides lubrication for the screw adapter 82, nut assembly 80 (i.e., the plurality of roller screws), and the bearings 84. Although not specifically shown in FIGS. 6A and 6B, one or more embodiments of the electronic accumulator system 12 having a transfer chamber 57 may also include a compensator 64 for the dielectric fluid, which compensates for volume changes due to temperature, turbulence, or fluid loss, as previously described with respect to FIG. 5, for example.

Still referring to FIGS. 6A and 6B, according to one or more embodiments of the present disclosure, the electric motor 53 is coupled to and drives the shaft 59 in directions 74 and 76 to extend and retract first and second pistons 70, 72. That is, according to one or more embodiments of the present disclosure, the electric motor 53 drives the shaft 59 to alternatingly compress working fluid (e.g., hydraulic fluid) with the first piston 70 in the function chamber 54 to drive the working fluid out of the function chamber 54 via the pressure port 61, and compress transfer fluid (e.g., hydraulic fluid) with the second piston 72 in the transfer chamber 57 to drive the transfer fluid out of the transfer chamber 57 via a balance port 63. In this way, pressurized working fluid that exits the function chamber 54 via the pressure port 61 is able to actuate the BOP 28 to a closed position, according to one or more embodiments of the present disclosure. For example, the pressurized working fluid may actuate the BOP piston 29, which may represent at least one of a blind shear ram 42 and a casing shear ram 40 of a BOP 28 as previously described, to a closed position, according to one or more embodiments of the present disclosure. This closed position of the BOP 28 is shown in FIG. 6A, for example. Moreover, the pressurized transfer fluid may provide additional fluid to facilitate returning the BOP 28 to a normal open position (i.e., actuating the BOP 28 in direction 74 from the closed position shown in FIG. 6A to an open position). In this way, the electronic accumulator system 12 and the BOP 28 create a closed loop as shown in FIG. 6A, according to one or more embodiments of the present disclosure.

Still referring to FIGS. 6A and 6B, the electronic accumulator system 12 may also include a third piston 78 according to one or more embodiments of the present disclosure. The third piston 78 is configured to separate the transfer chamber 57 from the balance chamber 58 in the electronic accumulator system 12, according to one or more embodiments of the present disclosure. The electronic accumulator system 12 according to one or more embodiments of the present disclosure may also include a fluid passage 86 extending longitudinally through the anti-rotating chamber 56, the transfer chamber 57, and the balance chamber 58, for example. According to one or more embodiments of the present disclosure, the fluid passage 86 includes an open end proximate the balance chamber 58 (i.e., at the balance port 63), a closed end 87 proximate the anti-rotating chamber 56, and an outlet 88 in fluid communication with the transfer chamber 57. According to one or more embodiments of the present disclosure, the fluid passage 86 is configured to receive, via the open end at the balance port 63, excess working fluid from the actuation of the drilling component (e.g., the BOP piston 29 of the BOP 28) to the closed position. Additionally, the fluid passage 86 of the electronic accumulator system 12 according to one or more embodiments of the present disclosure is configured to supply, via the outlet 88 and the third piston 78, the received working fluid into the transfer chamber 57 as the transfer fluid. In view of FIG. 6A, as the transfer chamber 57 fills with transfer fluid, the third piston 78 moves in direction 76 until the third piston 78 bottoms out within the housing 50 of the electronic accumulator system 12, as shown in FIG. 6B. As the third piston 78 moves in direction 76, balance fluid or seawater may be flushed out of the balance chamber 58, as previously described, such that all of the balance fluid or seawater is displaced with transfer fluid, as shown in FIG. 6B, for example. Further, the fluid passage 86 is configured to supply, via the open end at the balance port 63, the transfer fluid from the transfer chamber 57 to facilitate actuation of the drilling component (e.g., the BOP piston 29 of the BOP 28) to the open position. After this open sequence, balance fluid or seawater coming into the balance chamber 58 of the electronic accumulator system 12 will push the third piston 78 in direction 74 to a previous position, as the third piston 78 separates the transfer chamber 57 from the balance chamber 58.

Figure 7C:
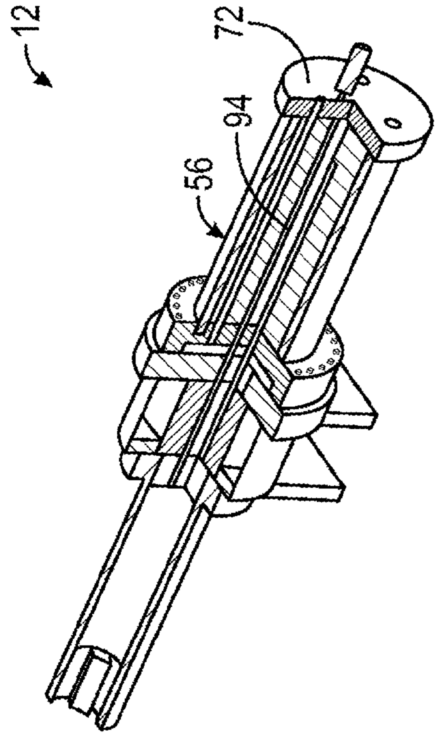
FIGS. 7A-7D show different anti-rotation systems for an electronic accumulator system, according to one or more embodiments of the present disclosure.
Figure 7D:
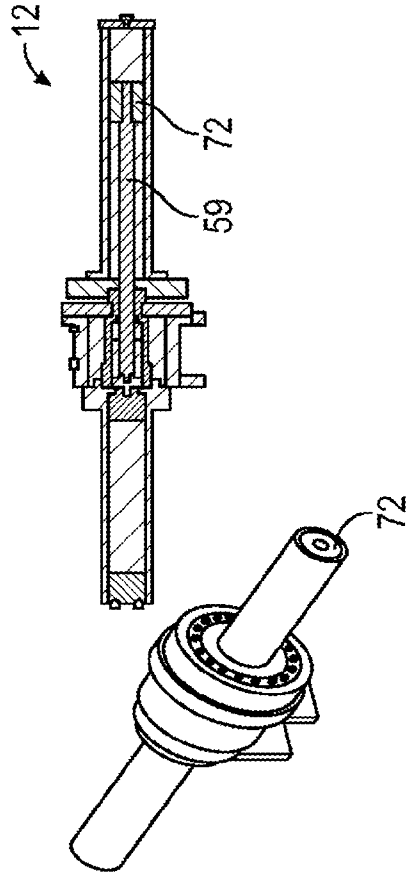
Figure 7A:
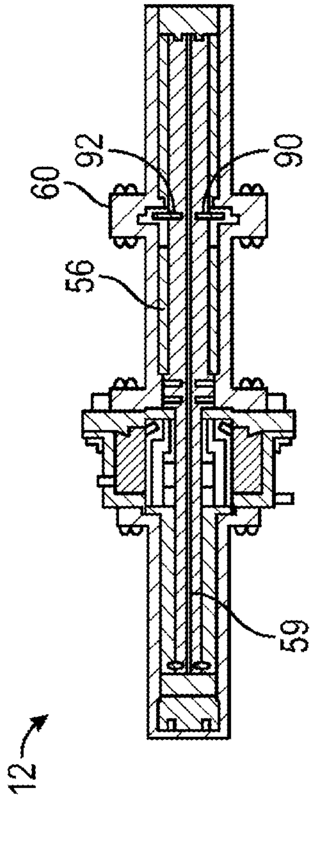
Figure 7B:
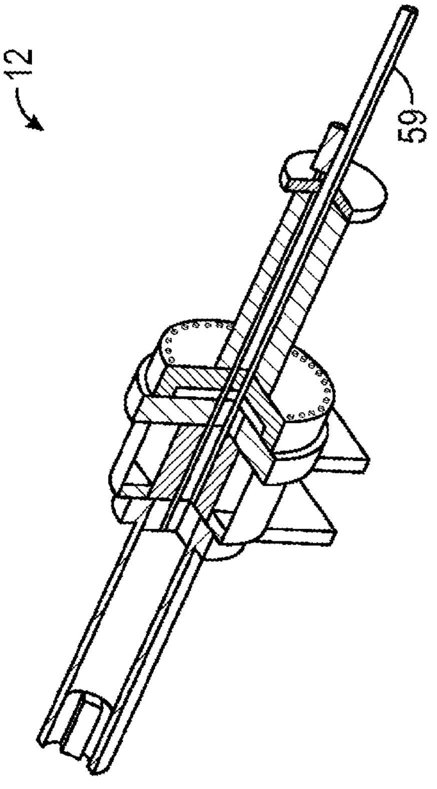

Referring now to FIGS. 7A-7D, different anti-rotation systems for an electronic accumulator system 12 according to one or more embodiments of the present disclosure are shown. For example, FIG. 7A shows that the shaft 59 of the electronic accumulator system 12 may include a keyway 90, and the anti-rotating chamber 56 may include a key 92 corresponding to the keyway 90. According to one or more embodiments of the present disclosure, engagement of the key 92 within the keyway 90 blocks rotation of the shaft 59. More specifically, the anti-rotating flange 60 and the engagement of the key 92 within the keyway 90 may block rotation in the plurality of roller screws of the nut assembly 80, which then provides the linear moment of the shaft 59. Further, FIG. 7B shows that the shaft 59 of the electronic accumulator system 12 may include a cross-section that assumes a non-circular shape to block rotation of the shaft 59. For example, the shaft 59 according to one or more embodiments of the present disclosure may assume a hexagonal shape to block rotation of the shaft 59, according to one or more embodiments of the present disclosure. FIG. 7C shows that the anti-rotating chamber 56 of the electronic accumulator system 12 may include at least one off-center rod 94 coupled to the second piston 72, according to one or more embodiments of the present disclosure. FIG. 7D shows that a cross-section of the second piston 72 of the electronic accumulator system 12 may assume a non-circular shape to block rotation of the shaft 59. According to one or more embodiments of the present disclosure, the non-circular shape of the second piston 72 may be an oblong shape for blocking rotation of the shaft. According to one or more embodiments of the present disclosure, one or more of the anti-rotation systems shown in FIGS. 7A-7D may be implemented in an electronic accumulator system 12 having a transfer chamber 57, such as that shown in FIGS. 6A and 6B, or in an electronic accumulator system 12 without a transfer chamber 57, such as that shown in FIG. 5, for example.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system comprising:
an accumulator system comprising:
- a housing, the housing comprising:
- a motor housing comprising an electric motor;
- a function chamber coupled to the motor housing;
- an anti-rotating chamber coupled to the motor housing;
- a balance chamber;
- a transfer chamber disposed between the anti-rotating chamber and the balance chamber;
- a shaft configured to move axially within the function chamber, the anti-rotating chamber, and the transfer chamber;
- a first piston coupled to a first end of the shaft;
- a second piston coupled to a second end of the shaft,
- wherein the electric motor is coupled to and drives the shaft to alternatingly compress working fluid with the first piston in the function chamber to drive the working fluid out of the function chamber, and compress transfer fluid with the second piston in the transfer chamber to drive the transfer fluid out of the transfer chamber; and
- a third piston configured to separate the transfer chamber from the balance chamber.

2. The system of claim 1,
wherein the anti-rotating chamber is defined by an anti-rotating flange, and
wherein the anti-rotating flange is configured to block rotation of the shaft as the shaft moves axially within the function chamber, the anti-rotating chamber, and the transfer chamber.

3. The system of claim 1, further comprising: a nut assembly coupled to the shaft and to the electric motor, wherein rotation of the nut assembly drives the shaft axially.

4. The system of claim 3, wherein the nut assembly comprises a planetary roller screw.

5. The system of claim 3, wherein the nut assembly couples to the electric motor with a screw adapter, and wherein rotation of the screw adapter is configured to rotate the nut assembly.

6. The system of claim 5, comprising a plurality of bearings that enable the rotation of the screw adapter.

7. The system of claim 1, further comprising:
a drilling component,
wherein the accumulator system is coupled to the drilling component, and
wherein the accumulator system is configured to pressurize the working fluid to actuate the drilling component to a closed position.

8. The system of claim 7, wherein the drilling component is a blowout preventer.

9. The system of claim 8, wherein the accumulator system is configured to pressurize the working fluid to actuate at least one of a blind shear ram and a casing shear ram of the blowout preventer to a closed position.

10. The system of claim 7, wherein the accumulator system is configured to pressurize the transfer fluid to actuate the drilling component to an open position.

11. The system of claim 10, wherein the accumulator system and the drilling component create a closed loop.

12. The system of claim 11,
wherein the accumulator system further comprises a fluid passage extending longitudinally through the anti-rotating chamber, the transfer chamber, and the balance chamber,
wherein the fluid passage comprises: an open end proximate the balance chamber; a closed end proximate the anti-rotating chamber; and an outlet in fluid communication with the transfer chamber,
wherein the fluid passage is configured to receive, via the open end, excess working fluid from the actuation of the drilling component to the closed position,
wherein the fluid passage is configured to supply, via the outlet and the third piston, the received working fluid into the transfer chamber as the transfer fluid, and
wherein the fluid passage is configured to supply, via the open end, the transfer fluid from the transfer chamber to facilitate actuation of the drilling component to the open position.

13. The system of claim 1, wherein the balance chamber is configured to receive seawater.

14. The system of claim 13, wherein the accumulator system further comprises a flushing port that flushes out excess seawater from the balance chamber.

15. The system of claim 1,
wherein the shaft comprises a keyway,
wherein the anti-rotating chamber comprises a key corresponding to the keyway, and
wherein engagement of the key within the keyway blocks rotation of the shaft.

16. The system of claim 1, wherein a cross-section of the shaft assumes a non-circular shape to block rotation of the shaft.

17. The system of claim 16, wherein the non-circular shape is a hexagonal shape.

18. The system of claim 1, wherein the anti-rotating chamber comprises at least one off-center rod coupled to the second piston.

19. The system of claim 1, wherein a cross-section of the second piston assumes a non-circular shape to block rotation of the shaft.

20. The system of claim 19, wherein the non-circular shape is an oblong shape.

* * * * *